United States Patent
Saito

(10) Patent No.: US 10,017,175 B2
(45) Date of Patent: Jul. 10, 2018

(54) HYBRID VEHICLE

(71) Applicant: MITSUBISHI JIDOSHA KOGYO KABUSHIKI KAISHA, Tokyo (JP)

(72) Inventor: Jun Saito, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/300,691

(22) Filed: Jun. 10, 2014

(65) Prior Publication Data

US 2014/0288747 A1 Sep. 25, 2014

Related U.S. Application Data

(63) Continuation of application No. PCT/JP2012/082648, filed on Dec. 17, 2012.

(30) Foreign Application Priority Data

Dec. 22, 2011 (JP) ................................. 2011-281989

(51) Int. Cl.
*B60W 10/02* (2006.01)
*B60W 10/06* (2006.01)
(Continued)

(52) U.S. Cl.
CPC ............. *B60W 20/20* (2013.01); *B60K 6/442* (2013.01); *B60W 10/02* (2013.01); *B60W 10/06* (2013.01);
(Continued)

(58) Field of Classification Search
None
See application file for complete search history.

(56) References Cited

U.S. PATENT DOCUMENTS 5,198,698 A * 3/1993 Paul .......................... H02J 9/08
307/46
5,710,465 A * 1/1998 Saito .................... B60R 16/0315
307/10.1
(Continued)

FOREIGN PATENT DOCUMENTS

CN 101954855 A 1/2011
JP 4-238730 A 8/1992
(Continued)

OTHER PUBLICATIONS

English translation JP2008-201170A.*
English Translation of JP04238730A.*

*Primary Examiner* — Rami Khatib
(74) *Attorney, Agent, or Firm* — Birch, Stewart, Kolasch & Birch, LLP

(57) ABSTRACT

A hybrid vehicle includes a traveling mode determination module configured to determine a traveling mode at least one of an internal-combustion engine traveling mode for running by transmitting motive power produced by the internal-combustion engine to wheels of the vehicle and an electric motor traveling mode for running by transmitting motive power produced by the electric motor to the wheels of the vehicle. The traveling mode determination module prohibiting the internal-combustion engine traveling mode and causing the vehicle to run in the electric motor traveling mode when the amount of the remaining fuel in the fuel tank is less than or equal to a first predetermined amount.

7 Claims, 4 Drawing Sheets

(51) Int. Cl.
  *B60W 10/08* (2006.01)
  *B60W 20/00* (2016.01)
  *B60W 20/20* (2016.01)
  *B60K 6/442* (2007.10)
  *B60W 20/10* (2016.01)

(52) U.S. Cl.
  CPC ............ B60W 10/08 (2013.01); B60W 20/10 (2013.01); *B60W 2560/02* (2013.01); *Y02T 10/6234* (2013.01); *Y02T 10/6269* (2013.01); *Y02T 90/14* (2013.01); *Y10S 903/93* (2013.01)

(56) References Cited

U.S. PATENT DOCUMENTS

| | | | | |
|---|---|---|---|---|
| 5,826,459 | A * | 10/1998 | Kataoka | G01F 23/36 73/1.73 |
| 2004/0251064 | A1* | 12/2004 | Imai | B60K 6/442 180/65.23 |
| 2007/0029121 | A1* | 2/2007 | Saitou | B60K 6/46 180/65.285 |
| 2007/0054166 | A1* | 3/2007 | Ojima | H01M 8/0441 429/408 |
| 2008/0093864 | A1* | 4/2008 | Kagoshima | B60K 6/48 290/40 A |
| 2008/0119950 | A1* | 5/2008 | Tung | H01M 8/04208 700/52 |
| 2008/0255755 | A1* | 10/2008 | Chen | G01F 9/008 701/123 |
| 2009/0205888 | A1 | 8/2009 | Steuernagel et al. | |
| 2011/0015811 | A1 | 1/2011 | Okubo et al. | |
| 2011/0257823 | A1* | 10/2011 | Watanabe | B60K 6/445 701/22 |
| 2011/0294620 | A1* | 12/2011 | Pruitt | B60K 6/48 477/5 |
| 2012/0072064 | A1* | 3/2012 | Kumazaki | F16H 61/0213 701/22 |
| 2012/0253578 | A1* | 10/2012 | Utsumi | B60K 6/26 701/22 |
| 2013/0069426 | A1* | 3/2013 | Nien | F01K 15/02 307/10.1 |
| 2013/0211641 | A1* | 8/2013 | Fujii | B60W 10/06 701/22 |
| 2014/0074335 | A1* | 3/2014 | Krauss | B60W 20/50 701/22 |
| 2014/0288747 | A1* | 9/2014 | Saito | B60K 6/442 701/22 |
| 2015/0046010 | A1* | 2/2015 | Wakashiro | B60K 6/46 701/22 |

FOREIGN PATENT DOCUMENTS

| | | |
|---|---|---|
| JP | 2006-44649 A | 2/2006 |
| JP | 2008201170 A * | 9/2008 |
| JP | 2009-127548 A | 6/2009 |
| JP | 2011-143828 A | 7/2011 |

* cited by examiner

HYBRID VEHICLE

CROSS REFERENCE TO RELATED APPLICATIONS

This application is a Continuation Application of PCT Application No. PCT/JP2012/082648, filed Dec. 17, 2012 and based upon and claiming the benefit of priority from prior Japanese Patent Application No. 2011-281989, filed Dec. 22, 2011, the entire contents of all of which are incorporated herein by reference.

BACKGROUND OF THE INVENTION

1. Field of the Invention

The present invention relates generally to a hybrid vehicle comprising an electric motor and an internal-combustion engine as driving sources for running.

2. Description of the Related Art

Conventionally, some vehicles comprising an internal-combustion engine as a driving source for running select a traveling mode which prioritizes fuel efficiency and run in this traveling mode when an amount of remaining fuel used in the internal-combustion engine becomes small. (For example, see Patent Literature 1.)

PATENT LITERATURE 1: Jpn. Pat. Appln. KOKAI Publication No. 2009-127548

The technology disclosed in Patent Literature 1 is technology to switch to the traveling mode which prioritizes fuel efficiency when the amount of the remaining fuel becomes small in the vehicle comprising the internal-combustion engine as a driving source for running. In this technology, if drive of the internal-combustion engine is stopped by decrease of the fuel, deceleration or deterioration of a driving feeling may occur.

In contrast, a hybrid electric vehicle comprising an electric motor and an internal-combustion engine as driving sources for running is conventionally under consideration. Such a hybrid electric vehicle has a series traveling mode for running only by the electric motor, and a parallel traveling mode using energy produced by the electric motor and the internal-combustion engine and using energy produced by the internal-combustion engine for generating electric power.

Even if the technology disclosed in Patent Literature 1 is applied to this type of hybrid vehicle, the deceleration or the deterioration of a driving feeling may occur in a state of running by the internal-combustion engine.

BRIEF SUMMARY OF THE INVENTION

The present invention therefore aims to provide a hybrid vehicle capable of suppressing deceleration or deterioration of a driving feeling caused by decrease of fuel in a hybrid electric vehicle comprising an electric motor and an internal-combustion engine as driving sources for running.

According to one embodiment of the present invention, a hybrid vehicle comprises an internal-combustion engine; an electric motor; a fuel tank configured to supply fuel to the internal-combustion engine; a remaining amount detection module configured to detect an amount of remaining fuel in the fuel tank; and a traveling mode determination module configured to determine a traveling mode at least one of an internal-combustion engine traveling mode for running by transmitting motive power produced by the internal-combustion engine to wheels of the vehicle and an electric motor traveling mode for running by transmitting motive power produced by the electric motor to the wheels of the vehicle. The traveling mode determination module prohibiting the internal-combustion engine traveling mode and causing the vehicle to run in the electric motor traveling mode when the amount of the remaining fuel in the fuel tank is less than or equal to a first predetermined amount.

Further, the hybrid vehicle comprises a transmission configured to transmit the motive power produced by the internal-combustion engine to the wheels via clutches in the internal-combustion engine traveling mode; and a clutch control module configured to control connection and disconnection of the clutches. The clutch control module prohibiting the internal-combustion engine traveling mode by setting the clutches in a disconnected state.

Furthermore, in the hybrid vehicle when the remaining amount detection module detects the amount of the remaining fuel in the fuel tank being equal to a second predetermined amount greater than the first predetermined amount, the remaining amount detection module starts calculation of a fuel consumption, and determines a value acquired by subtracting the consumption from the second predetermined amount as the amount of the remaining fuel in the fuel tank.

According to the present invention, deceleration or deterioration of a driving feeling caused by decrease of fuel can be suppressed.

DETAILED DESCRIPTION OF THE INVENTION

Figure 1:
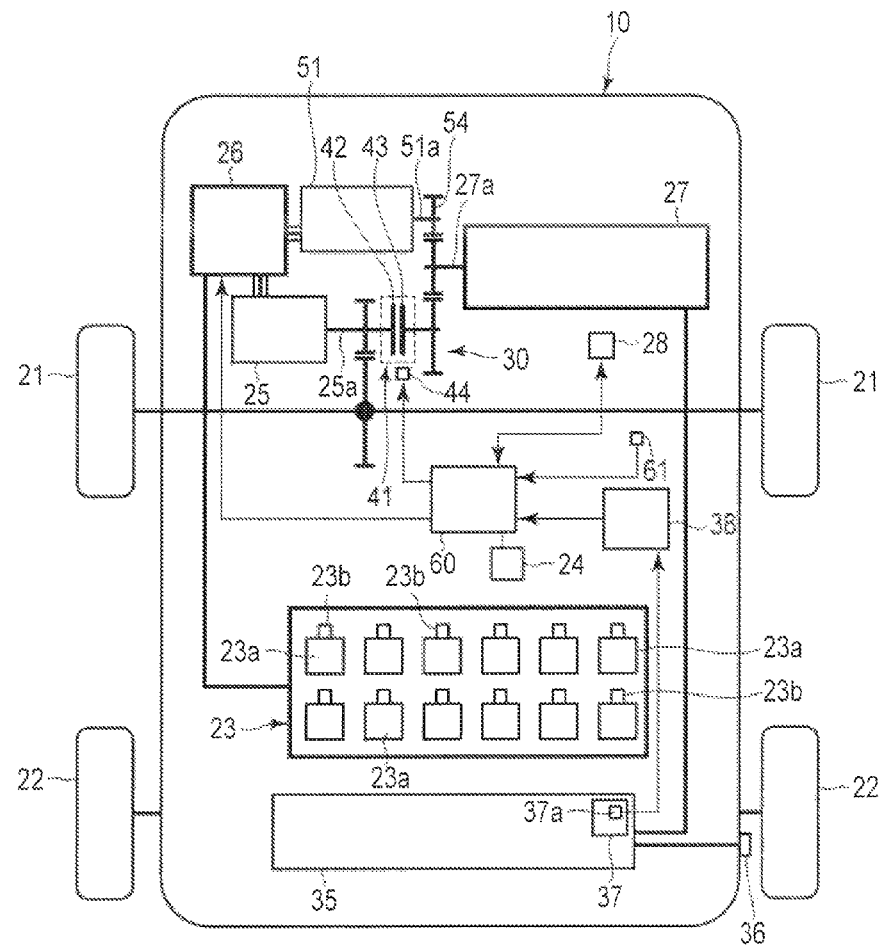
FIG. 1 is a schematic view showing a plug-in hybrid electric vehicle of a first embodiment.

A hybrid electric vehicle according to a first embodiment of the present invention will be described hereinafter with reference to FIG. 1 to FIG. 3. FIG. 1 is a schematic view showing a plug-in hybrid electric vehicle 10 of the first embodiment of the present invention. As shown in FIG. 1, the plug-in hybrid electric vehicle 10 comprises a traveling system, a charging system and a hybrid vehicle electric control unit (HV-ECU) 60.

The traveling system comprises paired front wheels 21, paired rear wheels 22, a battery 23, a battery management unit (BMU) 24, an electric motor 25 serving as a driving source for running, an inverter 26, an internal-combustion engine 27 serving as a driving source for running, a transmission 30 configured to transmit motive power produced by the internal-combustion engine 27 and drive power produced by the electric motor 25 to the front wheels 21, and a fuel tank 35.

The battery 23 comprises a plurality of battery cells 23a. The battery cells 23a are connected, for example, in series. A cell monitor unit (CMU) 23b is provided in each battery cell 23a. Each CMU 23b detects a status of the corresponding battery cell 23a. The status of the battery cells 23a is, for example, a temperature, a voltage, etc., of the battery cells 23a. Each CMU 23b transmits a detection result to the BMU 24.

The BMU 24 detects a status of the battery 23 based on information on the battery cells 23a transmitted from each CMU 23b. The status of the battery 23 is, for example, a voltage, a state of charge (SOC), etc., of the battery 23.

The electric motor 25 is driven by electric power supplied from the battery 23. An output shaft 25a of the electric motor 25 is rotated by driving the electric motor 25. The inverter 26 is connected to the battery 23 and the electric motor 25, and functions to supply electric power corresponding to required torque to the electric motor 25.

The internal-combustion engine 27 is controlled by an internal-combustion engine controller 28. More specifically, the internal-combustion engine controller 28 controls an amount of fuel supplied to an interior of a combustion chamber of the internal-combustion engine 27 in accordance with the required torque. The fuel is stored in the fuel tank 35. The fuel is supplied to the fuel tank 35 through a fill opening 36 formed on a vehicle body.

A measuring instrument configured to detect an amount of remaining fuel is provided in the fuel tank 35. The measuring instrument 37 is designed to be in, for example, a float type comprising a float 37a. The float 37a floats on a liquid surface of the fuel in the fuel tank 35. A position of the float 37a changes along with a change of a position of the liquid surface in accordance with the remaining fuel amount. The measuring instrument 37 outputs a signal according to the position of the float 37a. A fuel gauge 38 is provided near a driver seat. The fuel gauge 38 is connected to the measuring instrument 37 and displays the remaining fuel amount according to the output of the measuring instrument 37.

The transmission 30 transmits rotation of the output shaft 25a of the electric motor 25 or rotation of the output shaft 27a of the internal-combustion engine 27 to the front wheels 21. The transmission 30 comprises an axle configured to connect both of the front wheels 21, a differential gear provided at the axle shaft, a clutch module 41, etc.

The clutch module 41 comprises a clutch plate 42 configured to be rotated integrally with the output shaft 25a of the electric motor 25, a clutch plate 43 configured to be rotated integrally with the output shaft 27a of the internal-combustion engine 27, and a clutch plate driver 44 configured to press the clutch plates 42 and 43 against each other such that the clutch plates 42 and 43 are in a connected state of being integrally rotatable, and to separate the clutch plates 42 and 43 from each other such that the clutch plates 42 and 43 are in an unconnected state. The clutch plate driver 44 operates by a command from a clutch control module included in the HV-ECU 60.

The clutch plates 42 and 43 are provided in a transmission path through which the rotation of the output shaft 27a of the internal-combustion engine 27 is transmitted to the front wheels 21. The rotation of the output shaft 27a of the internal-combustion engine 27 is transmitted to a side of the front wheels when the clutch plates 42 and 43 are in the connected state. When the clutch plates 42 and 43 are in the unconnected state, the rotation of the output shaft 27a of the internal-combustion engine 27 is not transmitted to the front wheels 21. The rotation of the output shaft 25a of the electric motor 25 is transmitted to the front wheels 21 regardless of whether the clutch plates 42 and 43 are in the connected state or the unconnected state.

The charging system comprises a generator 51, the inverter 26 and the internal-combustion engine 27. The output shaft 27a of the internal-combustion engine 27 is connected to an input shaft 51a of the generator 51 via a transmission for power generation 54. When the internal-combustion engine 27 is driven and the output shaft 27a is rotated, the rotation of the output shaft 27a is transmitted to the input shaft 51a of the generator 51 via the transmission for power generation 54, and the input shaft 51a is rotated. When the input shaft 51a is rotated, a rotor in the generator 51 is rotated and the generator 51 thereby generates electric power.

The generator 51 is connected to the inverter 26. The electric power generated by the generator 51 is supplied to the battery 23 after being adjusted to be suitable for charging of the battery 23. The battery 23 is thereby charged.

The HV-ECU 60 is connected to the fuel gauge. The HV-ECU 60 obtains information on the remaining fuel amount from the fuel gauge 38. An accelerator pedal opening detector 61 is provided near an accelerator pedal. The accelerator pedal opening detector 61 detects a degree of opening of the accelerator pedal. A traveling mode determination module included in the HV-ECU 60 controls various types of modules so as to switch, in accordance with information on the SOC of the battery 23 transmitted from the BMU 24 and a detection value of the accelerator pedal opening detector 61, an EV traveling mode for running only by the motive power produced by the electric motor 25, a series traveling mode for running only by the motive power produced by the electric motor 25 and charging the battery by driving the generator 51, a parallel traveling mode for running by the motive power produced by the electric motor 25 and the motive power produced by the internal-combustion engine 27, and an engine traveling mode for not driving the electric motor 25 but running only by the motive power produced by the internal-combustion engine 27. In the present embodiment, an internal-combustion engine traveling mode includes the parallel traveling mode and the engine traveling mode, and an electric motor traveling mode includes the EV traveling mode and the series traveling mode.

More specifically, if the SOC of the battery 23 is sufficient, the clutch plate driver 44 is controlled and the clutch plates 42 and 43 are set in the unconnected state so as to select the EV traveling mode. Then, the battery 23, the inverter 26, the electric motor 25, etc., are controlled and the electric motor 25 is driven by the electric power supplied from the battery 23. Thus, the motive power produced by the electric motor 25 is transmitted to the front wheels 21, and the plug-in hybrid electric vehicle 10 thereby runs.

When the SOC of the battery 23 is decreased, the clutch plate driver 44 is controlled and the clutch plates 42 and 43 are set in the unconnected state so as to select the series traveling mode. Then, the battery 23, the inverter 26, the electric motor 25, the generator 51, etc., are controlled and the internal-combustion engine 27 is driven by using the generator 51 as a starter. The internal-combustion engine 27 is operated with a high degree of power generation efficiency under control of the internal-combustion engine controller 28, and the generator 51 generates electric power. Running by the electric motor 25 in the series traveling mode is the same as running using the electric motor 25 in the EV traveling mode.

If torque of the electric motor 25 is not enough for the required torque based on a detection result of the accelerator pedal opening detector 61, the clutch plate driver 44 is controlled and the clutch plates 42 and 43 are set in the connected state so as to select the parallel traveling mode. Then, the generator 51 and the internal-combustion engine controller 28 are controlled, and the internal-combustion engine is actuated by starting the generator 51 and driven under control of the internal-combustion engine controller 28 so as to assist the generator 51. In the parallel traveling mode, since the output shaft 27a of the internal-combustion engine 27 is transmitted to the input shaft 45a of the generator 51 by the transmission for power generation 54, electric power is also generated by the generator 51.

When the remaining fuel amount becomes less than or equal to a predetermined amount in the parallel traveling mode, the clutch plate driver 44 is controlled such that the vehicle runs by the motive power produced by the electric motor 25. This point will be specifically described hereinafter.

When the plug-in hybrid electric vehicle 10 is in the parallel traveling mode, the motive power produced by the electric motor 25 and the motive power produced by the internal-combustion engine 27 are transmitted to the front wheels 21 by the transmission 30. Therefore, the output shaft of the internal-combustion engine 27 and the output shaft 25a of the electric motor 25 are connected to each other via the transmission 30.

When the remaining fuel amount is decreased in the parallel mode, torque generated by the internal-combustion engine 27 is reduced. Consequently, deceleration and deterioration of a driving feeling occur. The predetermined amount is an amount that the torque of the internal-combustion engine 27 is reduced as described above when the fuel becomes less than or equal to the predetermined amount. The predetermined amount can be preliminarily grasped by experiments, etc.

Figure 3:
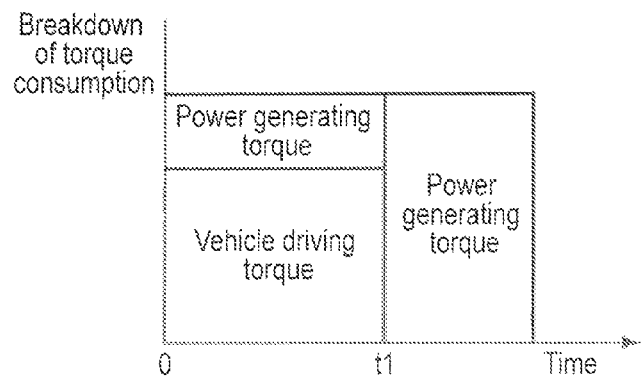
FIG. 3 is a graph showing a breakdown of consumption of torque generated by driving an internal-combustion engine of the plug-in hybrid electric vehicle.
Figure 4:
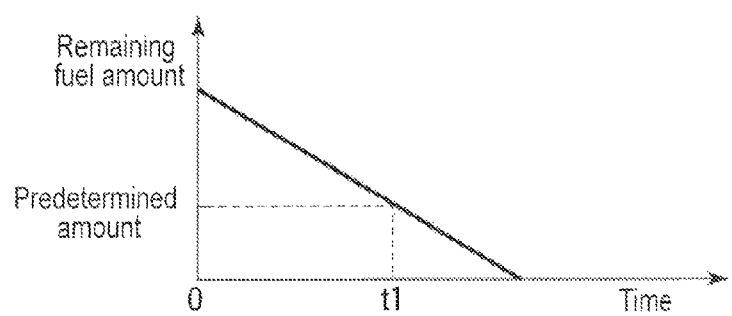
FIG. 4 is a graph showing an amount of remaining fuel in a fuel tank of the plug-in hybrid electric vehicle.
Figure 5:
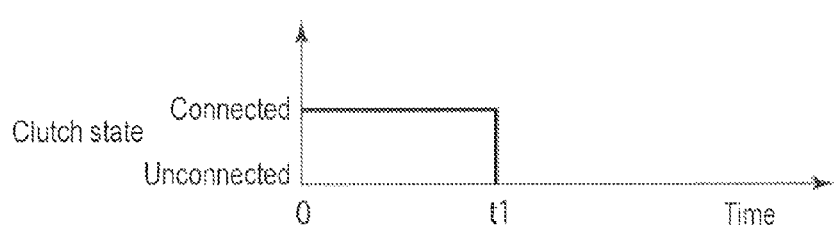
FIG. 5 is a graph indicating whether or not clutch plates of the plug-in hybrid electric vehicle are set in a connected state in accordance with a lapse of time.

Operations of the HV-ECU 60 in the parallel traveling mode will be described with reference to FIG. 2 to FIG. 5. FIG. 2 is a flowchart showing operations of the HV-ECU 60 in the parallel traveling mode. FIG. 3 is a graph showing a breakdown of consumption of the torque generated by driving the internal-combustion engine 27. The horizontal axis indicates a lapse of time, and indicates that the time passes in the direction of the arrow. The vertical axis of FIG. 3 indicates the breakdown of consumption of the torque. FIG. 4 is a graph showing variation in the remaining fuel amount in accordance with the lapse of time. The horizontal axis of FIG. 4 indicates the lapse of time, and indicates that the time passes in the direction of the arrow. The vertical axis of FIG. 4 indicates the remaining fuel amount, and indicates that the amount increases in the direction of the arrow. FIG. 5 is a graph indicating whether or not the clutch plates 42 and 43 are set in the connected state in accordance with the lapse of time. The horizontal axis of FIG. 5 indicates the lapse of time, and indicates that the time passes in the direction of the arrow. In each of the graphs of FIG. 3 to FIG. 5, an origin indicates a time point when the parallel traveling mode is started.

Figure 2:
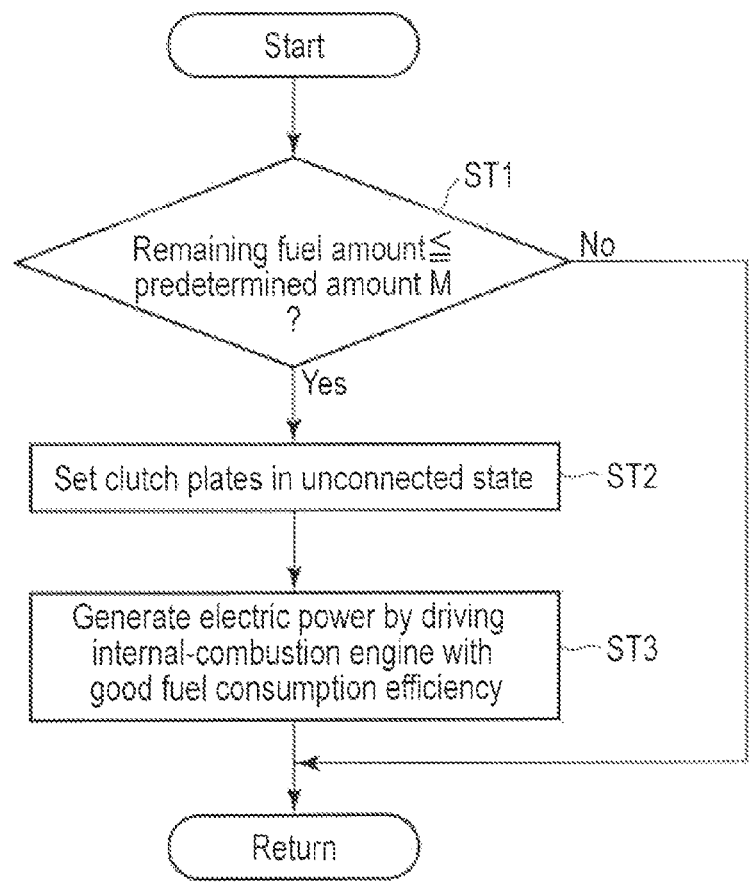
FIG. 2 is a flowchart showing operations of an HV-ECU in a parallel traveling mode of the plug-in hybrid electric vehicle.

As shown in FIG. 2, in step ST1, when the parallel traveling mode is started, the HV-ECU 60 determines whether or not the remaining fuel amount in the fuel tank 35 is less than or equal to a predetermined amount M (first predetermined amount) based on information on the remaining fuel amount which can be obtained from the fuel gauge 38.

If the fuel amount is greater than the predetermined amount, the parallel traveling mode is continued. If the amount of the fuel becomes equal to the predetermined amount M (first predetermined amount) when time t1 has passed after the start of the parallel traveling mode, the processing proceeds to step ST2.

In step ST2, the HV-ECU 60 controls the clutch plate driver 44, sets the clutch plates 42 and 43 in the unconnected state, and subsequently prohibits the clutch plates 42 and 43 from being in the connected state. Then the processing proceeds to step ST3.

It should be noted that the operation of the internal-combustion engine 27 is not stopped in the step ST2. Since the clutch plates 42 and 43 are set in the unconnected state until time t1 has passed after the start of the parallel traveling mode, the torque generated by the internal-combustion engine 27 is transmitted to the front wheels 21 via the transmission 30 and also transmitted to the generator 51 via the transmission for power generation 46. Therefore, as shown in FIG. 3, the breakdown of the torque generated by the internal-combustion engine 27 is electric power generating torque and vehicle driving torque until the remaining fuel amount becomes equal to the predetermined amount M.

In step ST3, the HV-ECU 60 controls the internal-combustion engine controller 28 and the generator 51, and generates electric power by driving the internal-combustion engine 27 at a rotation speed of the best fuel consumption efficiency and driving the generator 51. Then, the processing returns to step ST1. After that, as shown in FIG. 4, the internal-combustion engine 27 is operated at the rotation speed of the best fuel consumption efficiency and drives the generator 51 until the fuel in the fuel tank 35 runs out.

When the fuel is supplied to the fuel tank 35, the prohibition of the connected state of the clutch plates 42 and 43 is released. Then, the parallel traveling mode is started and the processing is executed from step ST1 again.

In the plug-in hybrid electric vehicle 10 configured as described above, when the remaining fuel amount becomes less than or equal to the predetermined amount M by which the deceleration or the deterioration of a driving feeling occurs, the clutch plates 42 and 43 are set in the unconnected state and sudden deceleration or sudden deterioration of a driving feeling can be thereby suppressed.

When the remaining fuel amount becomes less than or equal to the predetermined amount M, the internal-combustion engine 27 is operated at the rotation speed of the best fuel consumption efficiency and the generator 51 is driven. Since the small amount of fuel can be efficiently converted into electric power, the running distance of the plug-in hybrid electric vehicle 10 can be extended.

Next, a hybrid electric vehicle of a second embodiment will be described with reference to FIG. 6. The elements having the same functions as those in the first embodiment are represented by the same reference numerals in the first embodiment and their detailed descriptions are omitted. In the present embodiment, a function of a HV-ECU 60 is different from the HV-ECU 60 of the first embodiment. Other structures are the same as the first embodiment. The different point will be described hereinafter.

Figure 6:
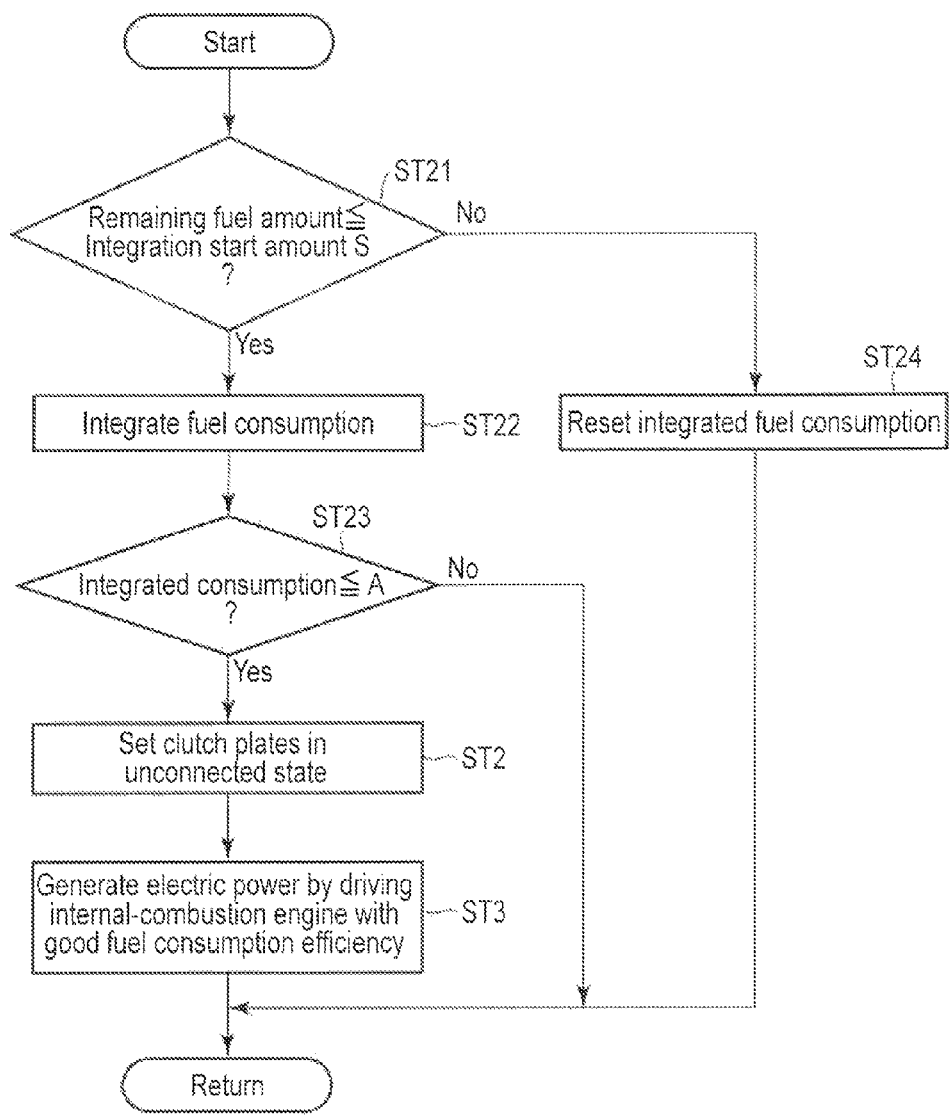
FIG. 6 is a flowchart showing operations of an HV-ECU in a parallel traveling mode of a plug-in hybrid electric vehicle of a second embodiment.

FIG. 6 is a flowchart showing operations of the HV-ECU 60 of the present embodiment. As shown in FIG. 6, in the present embodiment, the HV-ECU 60 executes processing of step ST21 instead of step ST1 and executes processing of steps ST22 and ST23 between step ST21 and step ST2.

More specifically, when a parallel traveling mode is started, the HV-ECU 60 proceeds to step ST21. In step ST21, the HV-ECU 60 determines whether or not the remaining fuel amount becomes less than or equal to an integration start amount S (second predetermined amount) based on information on the remaining amount obtained from a fuel gauge 38. If the HV-ECU 60 determines that the remaining fuel amount becomes equal to the integration start amount, the processing proceeds to step ST22.

In step ST22, the HV-ECU 60 starts integration of a fuel consumption. The relationship between the predetermined amount M (first predetermined amount) and the integration start amount S (second predetermined amount) will be specifically described. The integration start amount S is an amount greater than the predetermined amount M. When the fuel amount becomes small, the remaining amount may not be accurately detected depending on a measuring instrument 37. In the present embodiment, the predetermined amount M is an amount which cannot be accurately detected by the measuring instrument 37. The predetermined amount M is the same amount as the predetermined amount M of the first embodiment. The integration start amount S is an amount which can be accurately detected by the measuring instrument 37. The remaining fuel amount can be accurately determined by integrating the fuel consumption after the time when the remaining fuel amount becomes equal to the integration start amount S, and subtracting the integrated amount from the integration start amount S.

An internal-combustion engine controller 28 controls the amount of the fuel supplied to an interior of a combustion chamber of an internal-combustion engine 27. The internal-combustion engine controller 28 therefore comprises information on the fuel consumption. The HV-ECU 60 obtains the information on the fuel consumption from the internal-combustion engine controller 28. After the integration of the fuel consumption is started, the processing proceeds to step ST 23.

In step ST23, the HV-ECU 60 determines whether or not the integrated amount is greater than or equal to A. The integrated amount A is an amount which satisfies the relation of (integration start amount S)−(integrated amount A)= (predetermined amount M). The processing of steps ST21, ST22 and ST23 is repeated until the integrated amount becomes equal to A. When the integrated amount becomes equal to A, the HV-ECU 60 determines that the remaining fuel amount becomes equal to the predetermined amount M. After the integrated amount becomes equal to A, the processing proceeds to step ST2.

Furthermore, when fuel is supplied to a fuel tank 35 and the remaining fuel amount becomes greater than the integration start amount S in a state of proceeding to step ST22 and starting the integration of the fuel amount in the parallel traveling mode, the processing proceeds from step ST21 to step ST24. In step ST24, the HV-ECU 60 resets the integrated amount.

In the present embodiment, the same advantage as that of the first embodiment can be achieved. In addition, even if the measuring instrument 37 configured to detect the remaining fuel amount in the fuel tank 35 cannot accurately detect the predetermined amount M, the remaining fuel amount can be accurately detected by setting the amount which can be accurately detected by the measuring instrument 37 as the integration start amount S, starting the integration of the fuel consumption, and subtracting the integrated amount from the integration start amount S. Therefore, the clutch plates 42 and 43 can be accurately switched from the connected state to the unconnected state.

In the first and second embodiments, the transmission 30 is an example of a transmission which transmits motive power produced by an internal-combustion engine to wheels via clutches in an internal-combustion engine traveling mode. The clutch plates 42 and 43 are an example of clutches.

In the first and second embodiments, the HV-ECU 60 is an example of a traveling mode determination module which determines a traveling mode.

In the first and second embodiments, the measuring instrument 37, the fuel gauge 38 and the HEV-ECU 60 constitute an example of a remaining amount detection module which detects a remaining fuel amount.

In the first and second embodiments, the HEV-ECU 60 constitutes an example of a clutch control module which controls connection and disconnection of clutches.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A hybrid vehicle comprising:
    an internal-combustion engine;
    a battery;
    an electric motor operated by the battery;
    a generator driven by the internal-combustion engine to charge the battery;
    a fuel tank configured to supply fuel to the internal-combustion engine;
    a measuring instrument that detects an amount of remaining fuel in the fuel tank;
    a transmission configured to transmit motive power produced by the internal-combustion engine to wheels of the vehicle via clutches;
    a clutch control module configured to control connection and disconnection of the clutches; and
    a controller that determines a traveling mode from at least one of a parallel traveling mode for running by setting the clutches in a connected state and transmitting motive power produced by the internal-combustion engine to the wheels of the vehicle and a series traveling mode for running by setting the clutches in a disconnected state, driving the generator by the internal-combustion engine to generate electric power, and, while electric power is generated by the generator, transmitting motive power produced by the electric motor to the wheels of the vehicle,
    wherein the controller automatically prohibits the parallel traveling mode by setting the clutches in the disconnected state and causes the vehicle to run in the series traveling mode on the condition that the controller determines, based on the detected amount of the remaining fuel, that the amount of the remaining fuel in the fuel tank is less than or equal to a first predetermined amount, and
    wherein the controller continues the series traveling mode until the fuel in the fuel tank runs out.

2. The hybrid vehicle of claim 1, wherein
    the transmission transmits the motive power produced by the internal-combustion engine to the wheels via the clutches in the parallel traveling mode, and
    the controller prohibits the parallel traveling mode by setting the clutches in the disconnected state.

3. The hybrid vehicle of claim 2, wherein when the controller determines that the amount of the remaining fuel in the fuel tank is equal to a second predetermined amount greater than the first predetermined amount, the controller starts calculation of a fuel consumption, and determines a value acquired by subtracting the consumption from the second predetermined amount as the amount of the remaining fuel in the fuel tank.

4. The hybrid vehicle of claim 1, wherein when the controller determines that the amount of the remaining fuel in the fuel tank is equal to a second predetermined amount greater than the first predetermined amount, the controller starts calculation of a fuel consumption, and determines a value acquired by subtracting the consumption from the second predetermined amount as the amount of the remaining fuel in the fuel tank.

5. The hybrid vehicle of claim 1, wherein the internal-combustion engine drives the generator at a rotation speed at which a fuel consumption of the internal-combustion engine is smaller compared to the fuel consumption in the parallel traveling mode.

6. The hybrid vehicle of claim 1, wherein when the controller determines that the amount of the remaining fuel in the fuel tank is equal to a second predetermined amount greater than the first predetermined amount based on the amount of the remaining fuel detected by the measuring instrument, the controller starts calculation of a fuel consumption independently of the amount of the remaining fuel detected by the measuring instrument, and determines a value acquired by subtracting the consumption from the second predetermined amount as the amount of the remaining fuel in the fuel tank.

7. The hybrid vehicle of claim 6, wherein an accuracy of the amount of the remaining fuel detected by the measuring instrument is higher at the second predetermined amount compared to an accuracy of the detected amount of the remaining fuel at the first predetermined amount.

* * * * *